United States Patent
Carignano

[15] 3,642,356
[45] Feb. 15, 1972

[54] CINEMATOGRAPHIC PROJECTORS

[72] Inventor: Mario Carignano, Turin, Italy

[73] Assignee: Silma S.P.A., Turin, Italy

[22] Filed: Jan. 27, 1970

[21] Appl. No.: 6,083

[30] Foreign Application Priority Data

Jan. 29, 1969 Italy..................................50343-A/69
Feb. 22, 1969 Italy..................................50695-A/69

[52] U.S. Cl..............................................352/180, 352/169
[51] Int. Cl...............................................G03b 21/48
[58] Field of Search.........................................352/180, 169

[56] References Cited

UNITED STATES PATENTS

| | | |
|---|---|---|
| 3,489,492 | 1/1970 | Kobler et al. ..........................352/169 |
| 3,288,550 | 11/1966 | Saraber.................................352/180 |
| 3,481,662 | 12/1969 | Procop..................................352/180 |
| 3,520,596 | 7/1970 | O'Donnell et al.................352/169 X |
| 3,533,688 | 10/1970 | Painton.............................352/169 X |

*Primary Examiner*—Louis R. Prince
*Assistant Examiner*—Joseph W. Roskos
*Attorney*—Sughrue, Rothwell, Mion, Zinn & Macpeak

[57] ABSTRACT

A projector for cinematograph film of reduced gauge is provided with locking means for locking the film-driving element in a position of disengagement from the film, while the projector film drive mechanism for displacing the film-driving element remains in operation. The locking means are rendered inoperable at intervals by electrical impulses synchronized with the projector drive mechanism to cause the driving element to engage the film intermittently at intervals determined by the frequency of the impulses.

10 Claims, 8 Drawing Figures

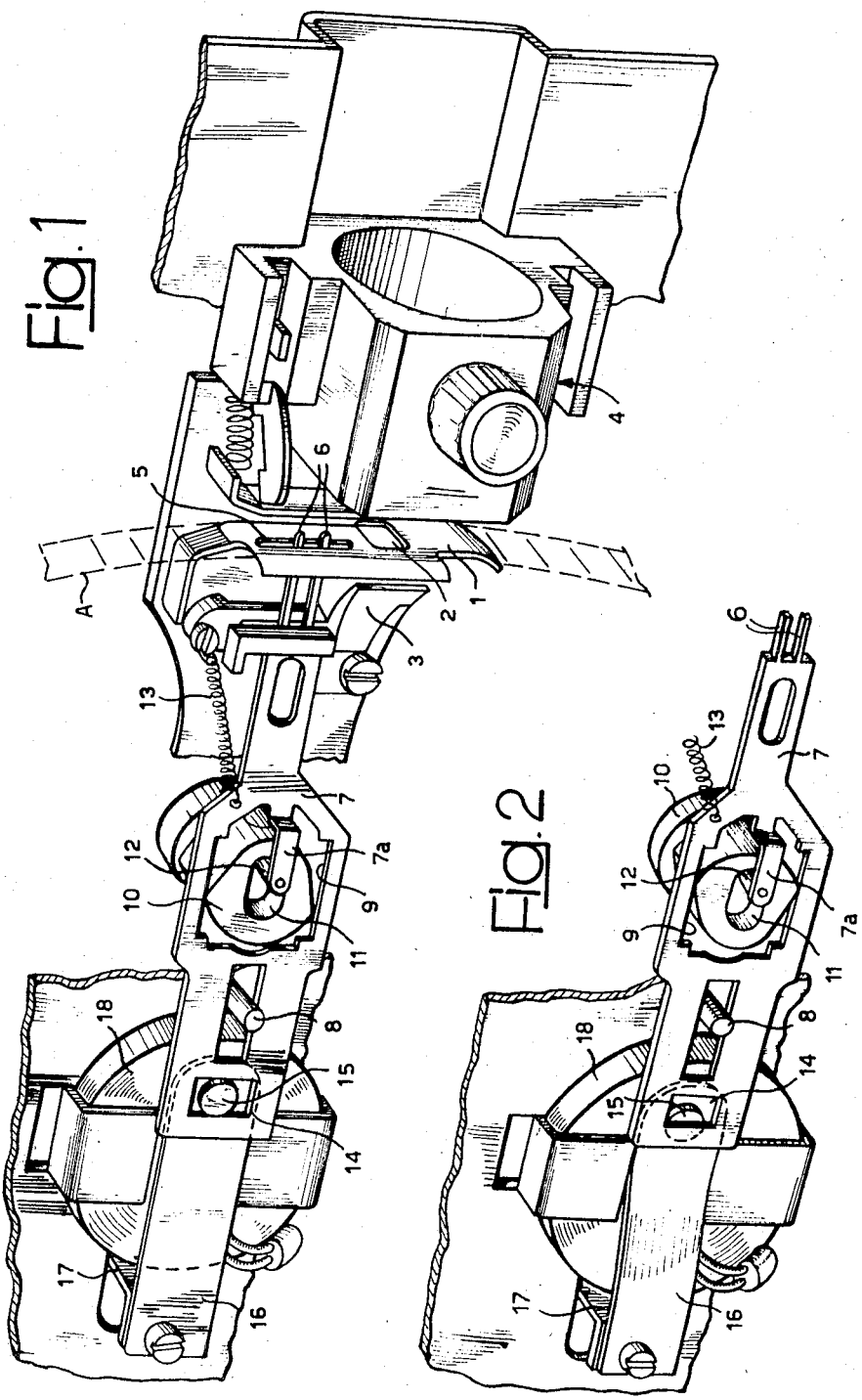

3,642,356

CINEMATOGRAPHIC PROJECTORS

The present invention relates to projectors for cinematograph films of reduced gauge. The invention concerns principally the problem of bringing about movement of the film at different speeds ranging from zero, when the film is stationary, to maximum speed, without varying the speed of the projector motor, nor of the film driving mechanism driven thereby.

In order to solve the aforesaid problem, the present invention has as its object to provide a projector with a device which permits manual programming of the film speed desired, selecting such speed as required from a range of preset speeds, including zero speed.

Another object of the invention is to provide a projector of the aforesaid type, in which the speed programming device is of simple, strong and economic construction, precise and reliable in operation and easy and practical in use.

A further object of the invention is to achieve a speed programming device of the aforesaid type, which is easily adaptable both to projectors of the type in which the element driving the film always moves in the same plane, and to projectors of the type in which the fork also shifts transversely, that is, three-dimensionally.

The main characteristic feature of the projector according to this invention resides in the provision of means operable to lock the driving element in a position of disengagement from the film, while the drive mechanism for displacing the film-driving element remains in operation, said means being rendered inoperable at intervals by electrical impulses synchronized with the said drive mechanism.

Further features and advantages of the invention will be apparent in the course of the following detailed description which follows, given by way of non-limiting example, with reference to the accompanying drawings, in which:

Fig. 1 is a perspective view of a device for moving the film, which is part of a cinematographic film projector according to the invention, illustrated in the stop position of the film-driving element;

FIG. 2 is a view, similar to that of FIG. 1, illustrating the device under normal operating conditions, that is with the film-driving element free to move;

Figure 3:
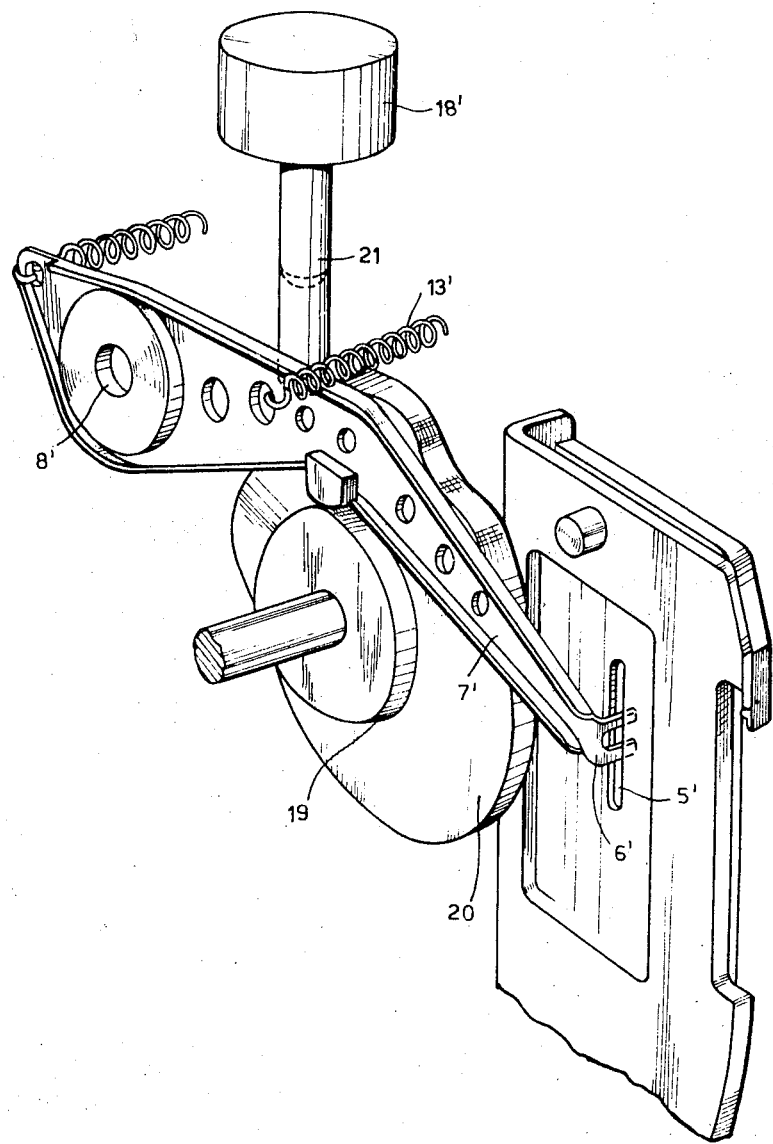
FIG. 3 is a perspective view illustrating another type of projector incorporating a device for moving the film according to the invention.

In FIGS. 1 and 2 is illustrated a well-known device for advancing the film, of reduced gauge, in a cinematograph projector. The film, indicated in broken outline at A, passes through a gate, indicated generally at 1, fitted with a projection frame opening 2. A mirror 3 is placed behind the frame opening 2 and cooperates with an optical projection unit 4 arranged in front of the gate 1.

Within the gate 1 a slit 5 is made, through which project two teeth 6 of a forked film-driving element 7. The driving element 7 comprises a shaped lever, pivoted so that it can oscillate and slide horizontally in a vertical plane relative to a fixed pivot pin 8.

The lever 7 has at the center a shaped aperture 9 into which a rotary cam 10 engages. The cam 10 is provided with an interior elongated cavity 11 cooperating with a roller 12 supported by an appendage 7a is integral with the lever 7.

The cooperation of the rotary cam 10 with the aperture 9 and with the roller 12 imparts to the forked element 7 a cyclic displacement following a quadrangular trajectory which lies in a vertical plane, causing successively the engagement of the teeth 6 in respective perforations of the film A, the driving of the film by the teeth 6 by one frame, the disengagement of the teeth 6 from the film perforations and the return of the member 7 to its original position.

A helical return spring 13 anchored to a fixed frame and attached to the member 7 ensures engagement of the teeth 6 of the member 7 in the perforations of the film A during the film-driving phase, by causing forward displacement of the forked member 7 when the cam 10 permits this.

Consequently the rotational speed of the cam 10 determines the speed of advance of the film, which is measured by counting how many frames per second pass in front of the projection frame opening 2. In traditional projectors the speed of the film can be varied by modifying the rotational speed of the cam 10.

In the projector according to this invention, however, the speed of advance of the film A can be varied while the speed of rotation of the cam 10 is kept constant by rendering the forked film-driving element 7 inactive for some operational cycles in each period of time. If, for example, the speed of projection is 16 frames per second, the cam 10 performs 16 rotations per second and oscillates the forked element 7 at the same frequency; if one wishes to have a film speed of one frame per second, it is necessary in each second to render the forked element 7 inactive for 15 consecutive cycles or rotations of the cam 10 and leave it free to drive the film for the 16th rotation, so that it may complete its operative cycle. Similarly, for a film speed of two frames per second, the forked element 7 will complete in each second only two operative cycles, alternated with 7 consecutive rest cycles when the element 7 is inactive, and so on.

To this end the element 7 has at its rear end a vertically elongated rectangular aperture 14 which cooperates with a locking member comprising a horizontal transverse pin 15, carried by an armature in the form of a flat spring 16 which is anchored at one end to a fixed support 17 and is displaceable in the direction of the axis of the pin 15, by the action of an electromagnet 18.

When the electromagnet 18 is deenergized, the elasticity of the flat spring 16 carries the pin 15 into engagement in the aperture 14 of the forked element 7, and consequently the latter is locked and prevented from forward displacement. The element 7 cannot therefore engage the film A, which remains stationary for the whole time during which the forked element 7 is locked, while the cam 10 nevertheless continues to rotate. When, on the other hand, the electromagnet 18 is energized, it attracts the flat spring 16, and the pin 15 is disengaged from the aperture 14, releasing the forked element 7 which can execute its normal film-driving movements.

In FIG. 3 there is illustrated an alternative form of driving device according to the invention, in which a forked driving element 7′ having film-engaging teeth 6′ is pivoted at 8′ and subject to rocking movement in a vertical plane under the action of a radial cam 19, mounted on a coupled to an axial cam 20 which subjects the element 7′ to transverse rocking movement in a horizontal plane. The combined action of the two cams 19, 20 gives to the forked element 7′ a three-dimensional trajectory which is well known. Engagement of the element 7′ with the cams 19 and 20 is ensured by return springs 13′.

A stop member 21, movable by means of an electromagnet 18′ is arranged to prevent, when the electromagnet 18′ is arranged to prevent, when the electromagnet 18′ is deenergized, the normal transverse rocking movement of the forked element 7′ and thereby prevent the advance of the film. When the electromagnet 18′ is energized the stop 21 occupies the position shown dotted and is clear of the path of movement of the element 7′.

In both the embodiments described above the electromagnet 18 or 18′ is energized intermittently, by means of electric current impulses synchronized to the rotation of the respective cam 10 or cams 19 and 20, so as to bring about different speeds of advance of the film, or its complete stoppage, without varying the speed of said cam or cams.

Figure 5:
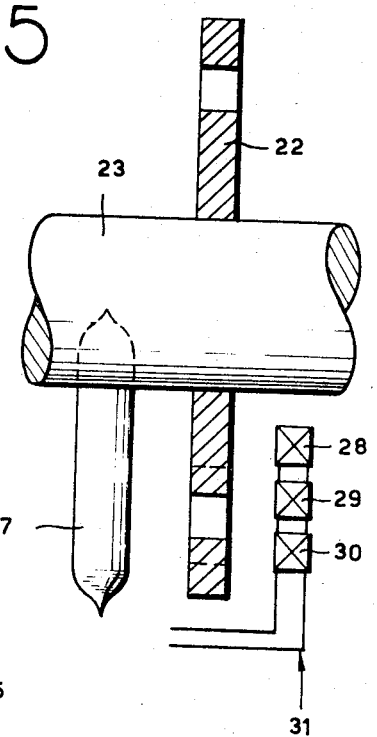
FIG. 5 is a cross section of the part shown in FIG. 4, taken along the line V–V of FIG. 4.
Figure 4:
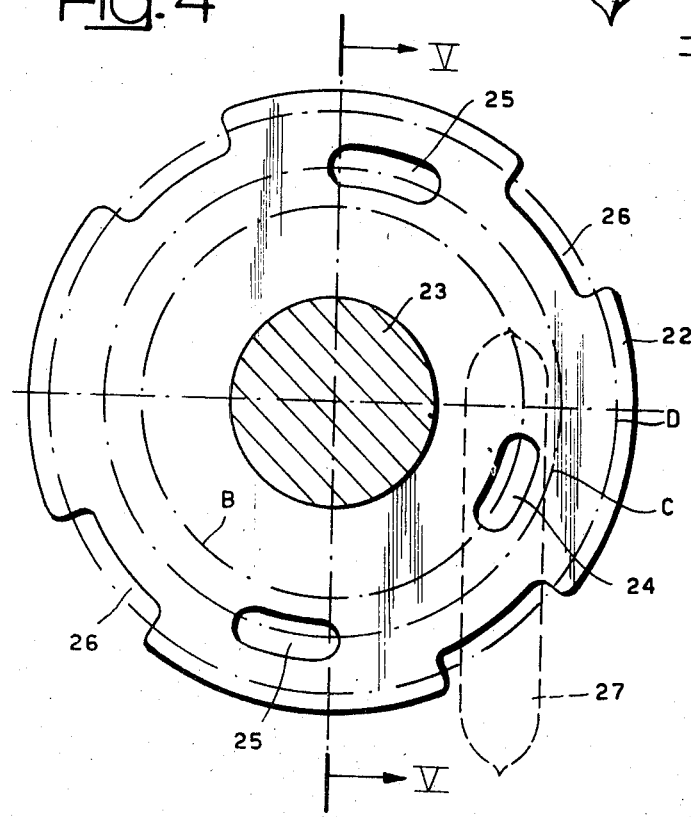
FIG. 4 is a front view of part of the film-driving device.
Figure 6:
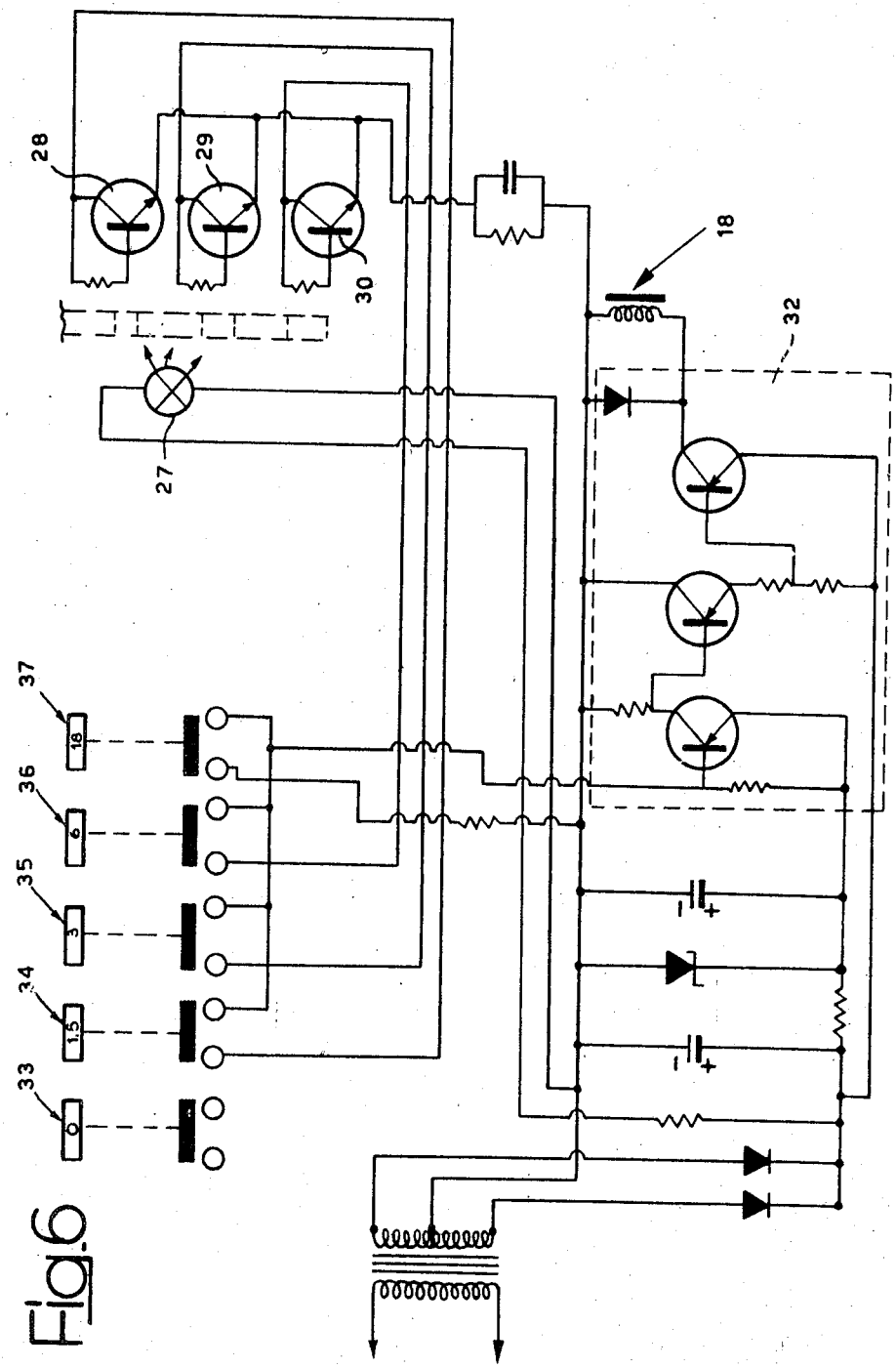
FIG. 6 is an electrical circuit diagram illustrating the wiring of the film-driving device.

One means for controlling the intermittent energization of the electromagnet 18 or 18' are illustrated in FIGS. 4, 5 and 6.

The electromagnet control means comprise a circular plate 22 keyed to a rotating shaft 23 and bearing a number of circumferentially elongated apertures 24, 25, 26 distributed at equal intervals on the plate 22 in various numbers on different concentric circles B, C, D; In this example there is one aperture 24 on the circle B, there are two apertures 25 on the circle C, and four apertures 26 on the circle D. These apertures 24, 25, 26 cooperate with a pencil-shaped lamp 27 located to one side of the plate 22 and cooperating with a number of photosensitive elements 28, 29, 30, located on the other side of the plate 22 in alignment with the lamp 27.

The photosensitive elements 28, 29, 30 form part of an electronic control circuit, shown diagrammatically in FIG. 6, which includes an amplifier 32 arranged to amplify pulses from the photosensitive elements to energize the coil of the electromagnet 18 (or 18'). The control circuit also includes a number of cutout switches 34, 35, 36 which when closed insert in the circuit, and therefore bring into operation, selectively, one or other of the aforesaid photosensitive elements 28, 29, 30, preventing the others from operating.

An additional cutout switch 33 serves when operated to deenergize the electromagnet 18, stopping the film completely, and maintaining the forked driving element locked.

The cutout switch 34 activates only one of the photosensitive elements, 28, cooperating with the aperture 24 on the innermost circle B of the plate 22. In the example illustrated the photosensitive element 28 causes an impulse to be transmitted to the electromagnet 18 for each complete turn of the plate 22, which would correspond to a film advance speed of one frame per second if the plate 22 has a speed of one revolution per second. The cutout switch 35 allows activation of only the photosensitive element 29, cooperating with the two apertures 25 on the circle C, in order to cause energization of the electromagnet 18 twice in each revolution of the plate 22: This corresponds to a film speed of two frames per second if the plate 22 rotates at one revolution per second. Similarly, the cutout switch 36 allows activation of only the photosensitive element 30 cooperating with the four apertures 26 on the circle D to cause energization of the electromagnet 18 four times in each revolution of the plate 22.

A further cutout switch 37 makes it possible to keep the electromagnet 18 continuously energized, so as to leave the forked element free and to drive the film normally at the maximum speed of the projector.

By varying the number of photosensitive elements, the number of circles on the plate 22 and the number of apertures on each circle, it is possible to obtain many different predetermined speeds of advance for the film.

The device described makes it possible to select and choose a film speed from a range of preset speeds extending from zero to a maximum speed, without needing to change the speed of the cam or cams and the driving motor of the projector.

Since the device makes use of simple electric and electronic circuits it is inherently reliable and accurate in operation, and is simple in construction and assembly.

Figure 7:
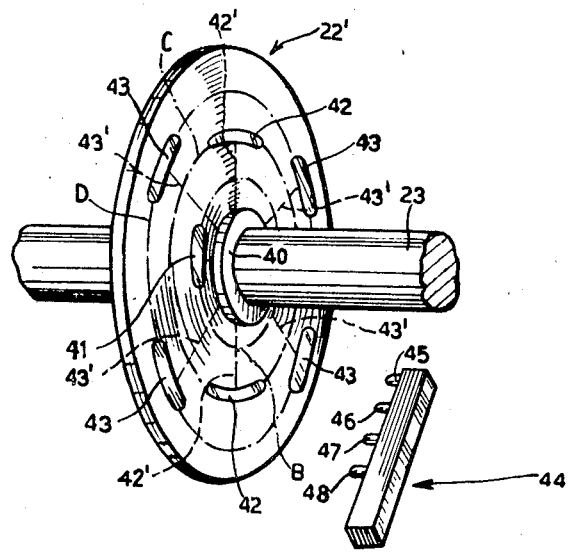
FIG. 7 is a perspective view of the part of the film-driving device illustrated in FIG. 4, according to one variant of the invention.
Figure 8:
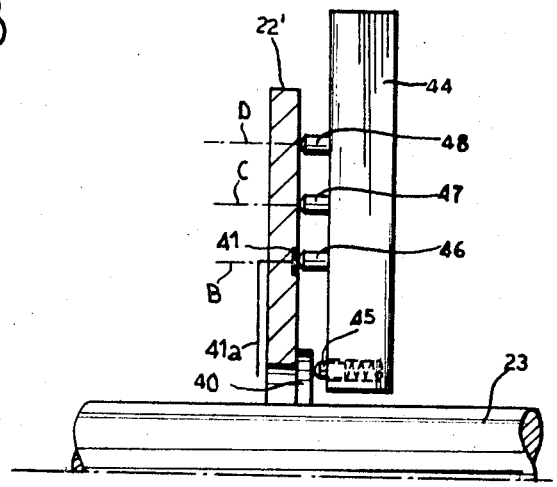
FIG. 8 is a diagrammatic axial section of the part illustrated in FIG. 7.

In FIGS. 7 and 8 there is illustrated a constructional variant relating to the means for controlling the energization of the electromagnet 18 or 18'.

According to this variant a rotating distributor comprising a plate 22', made of electrically insulating material, is keyed to a shaft 23 which is kinematically coupled to the film-driving mechanism.

The plate 22' has upon its front surfaces a central slip ring 40 and a number of sliding circumferentially elongated contacts 41, 42, 43, distributed along concentric circles B, D, D and electrically connected to the central slip ring 40.

Cooperating with the slip ring 40 and with the respective contacts 41, 42, 43 are respective sliding brushes 45, 46, 47, 48 carried by an insulating support 44 extending radially with respect to the center of and parallel to the contact-bearing surface of the plate 22'.

The innermost brush, 45, which cooperates with the slip ring 40, supplies electric current to the distributor, whilst the other brushes 46, 47, 48 make contact at regular intervals upon rotation of the plate 22' with the sliding contacts 41, 42, 43, distributed upon the different circles B, C and D.

The different brushes 46, 47, 48 are activated selectively by means of interruptor switches or other devices, not illustrated, which make it possible to activate any selected one of these three brushes, according to the desired film speed, excluding the other brushes from operation.

Connection of the different sliding contacts 41, 42, 43 to the central slip ring 40 can be affected, as illustrated in FIG. 8, by means of leads 41a (one only of which is shown, diagrammatically, in FIG. 8) which lead from the central slip ring 40 to the appropriate contacts, running along the back surface of the distributor plate 22' opposite the surface on which the contacts 41, 42, 43 are provided.

The reduced rotational speed of the distributor plate 22' ensures long life of the brushes 46, 47, 48, which are urged resiliently towards the plate 22' so as to remain in contact with the front surface thereof.

The sliding contacts 41, 42, 43 will normally comprise wires embedded in the front surface of the plate 22' to improve the working conditions of the brushes, 46, 47, 48 thereby reducing wear on the latter.

What is claimed is

1. In a projector for cinematograph film of reduced gauge, of a type including a drive mechanism and a displaceable film-driving element driven by said mechanism for moving the film intermittently, the improvement comprising means operable to lock the driving element in a position of disengagement from the film while the drive mechanism for displacing the film-driving element remains in operation, means providing electrical impulses synchronized with said drive mechanism, and control means responsive to said electrical impulses to render said locking means inoperable at predetermined intervals; said film-driving element having means defining an aperture, said means locking the displaceable film-driving element comprising a locking member which cooperates with said aperture in the driving element, and said control means including an electromagnet energizable thereby and having a movable armature carrying said locking member.

2. Projector according to claim 1, wherein the electromagnet when energized disengages the locking member from said aperture.

3. Projector according to claim 1, including a light source, a number of photosensitive elements cooperating with the light source, a rotary plate formed with apertures distributed on concentric circles corresponding to the positions of the different photosensitive elements and interposed between the source and said elements, and preselection means rendering each said element selectively operable to cause the electrical impulses therefrom to energize the electromagnet.

4. Projector according to claim 3, including additional preselection means effective respectively to deenergize the electromagnet to bring about the stopping of the film and to cause continuous energization of the electromagnet to obtain the maximum film speed.

5. Projector according to claim 1, wherein the control means comprise a rotating distributor having a plate of insulating material, a number of sliding contacts distributed on said plate along concentric circles, respective brushes in correspondence with the respective contacts and preselection means connecting the said contacts selectively to the electromagnet, said distributor being further provided with a slip ring and a cooperating brush feeding electric current to the said sliding contacts.

6. Projector according to claim 5, wherein the slip ring is provided centrally upon the distributor plate and including leads connecting the slip ring to the different sliding contacts, said leads being disposed on the rear face of the distributor plate remote from the face on which the sliding contacts are disposed.

7. In a projector for cinematograph film of reduced gauge, of a type including a drive mechanism and a displaceable film-driving element driven by said mechanism for moving the film intermittently, the improvement comprising means operable to lock the driving element in a position of disengagement from the film while the drive mechanism for displacing the film-driving element remains in operation, means providing electrical impulses synchronized with said drive mechanism, and control means responsive to said electrical impulses to render said locking means inoperable at predetermined intervals; said means locking the displaceable film-driving element comprising a stop member movable into and out of the path of movement of the element and an electromagnet engageable through said control means for controlling said movement of said stop member, a light source, a number of photosensitive elements cooperating with the light source, a rotary plate formed with apertures distributed on concentric circles corresponding to the positions of the different photosensitive elements, and interposed between the source and said elements, and preselection means rendering each said element selectively operable to cause the electrical impulses therefrom to energize the electromagnet.

8. Projector according to claim 7, including additional preselection means effective respectively to deenergize the electromagnet to bring about the stopping of the film and to cause continuous energization of the electromagnet to obtain the maximum film speed.

9. Projector according to claim 1, wherein the control means comprise a rotating distributor having a plate of insulating material, a number of sliding contacts distributed on said plate along concentric circles, respective brushes in correspondence with the respective contacts and preselection means connecting the said contacts selectively to the electromagnet, said distributor being further provided with a slip ring and a cooperating brush feeding electric current to the said sliding contacts.

10. Projector according to claim 9, wherein the slip ring is provided centrally upon the distributor plate and including leads connecting the slip ring to the different sliding contacts, said leads being disposed on the rear face of the distributor plate remote from the face on which the sliding contacts are disposed.

* * * * *